May 13, 1941.        H. J. WAECHTER        2,242,157
CRANK MECHANISM
Original Filed June 1, 1938
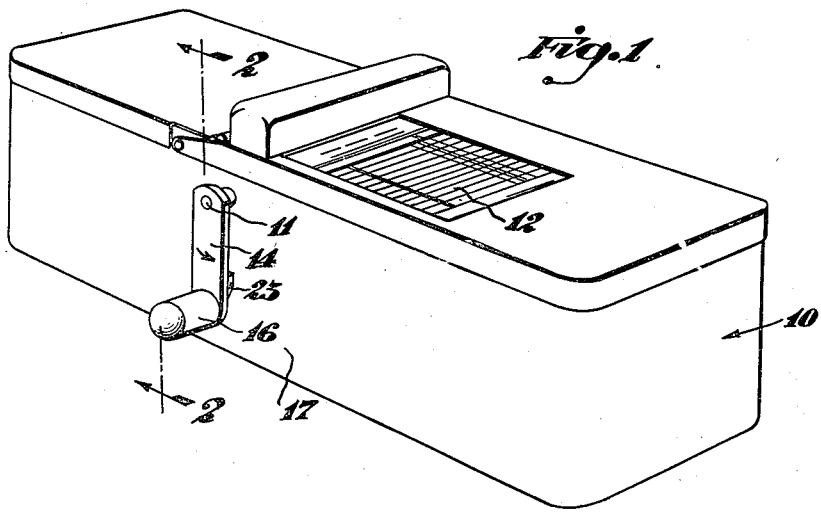
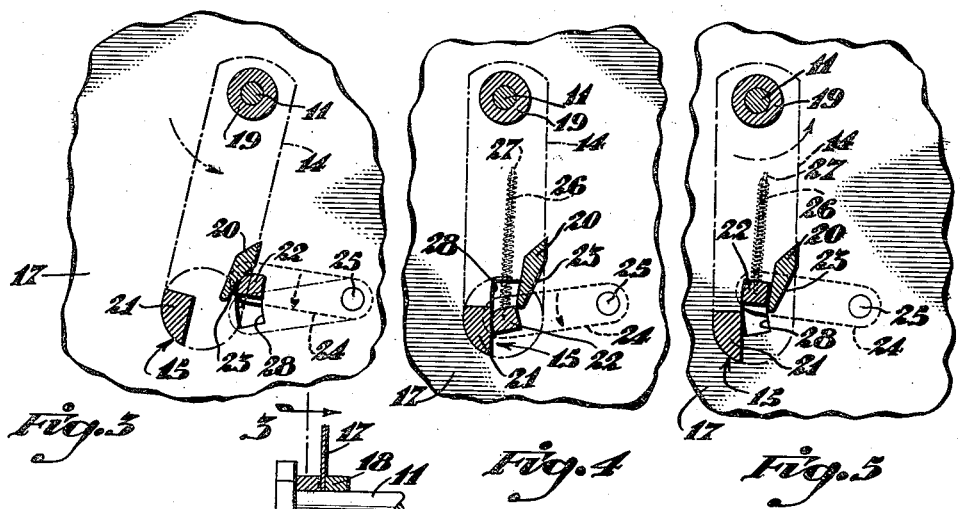
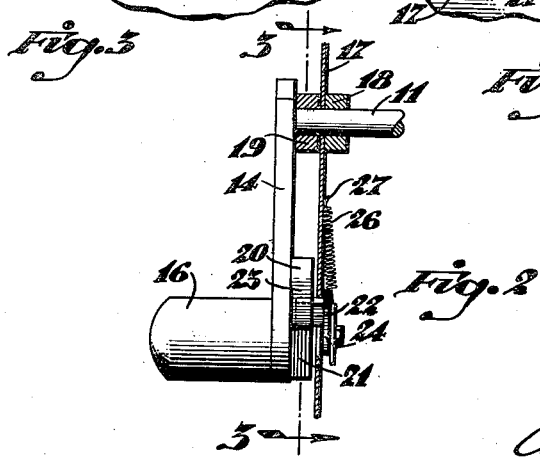
INVENTOR.
BY Harry J. Waechter
Wood & Wood ATTORNEYS Patented May 13, 1941

2,242,157

UNITED STATES PATENT OFFICE 2,242,157

CRANK MECHANISM

Harry J. Waechter, Mount Healthy, Ohio, assignor to Paul Benninghofen and Fritz G. Diesbach, both of Hamilton, Ohio, as trustees Original application June 1, 1938, Serial No. 211,203. Divided and this application February 6, 1940, Serial No. 317,565

1 Claim. (Cl. 74—528)

This invention relates to crank mechanism. More specifically, the invention relates to a crank mechanism operating, for example, a feeding means wherein the crank mechanism will stop the feed after one revolution of the crank.

Crank means adapted to operate the feed rolls of an autographic register has been employed before this time. In fact, the average autographic register is operated by means of a crank and the rotation of the crank has been stopped or interrupted after a full revolution, that is, enough to feed a predetermined length of autographic register paper. The interrupting means has constituted a depressible stop arrangement which could be moved from the path of revolution of the crank when the operator desired to proceed with the next succeeding feed operation. This, of course, means that two devices must be operated. First the pin stop must be manually depressed and while it is held down, the crank must be swung past it.

It has been the object of the present inventor to provide a crank mechanism operative in conjunction with a stop, which stop is effective for blocking further revolution at a predetermined point and which will, after having stopped the crank, move automatically to a position for permitting the next succeeding revolution of the crank without further attention on the part of the operator.

This apparatus has many advantages over the prior devices. Among these is the fact that it does not require manual actuation apart from the swinging movement of the crank. It is not only positive in its operation but equally positive in its release.

It has been the further object to provide that the mechanism will not release the crank until the rotative pressure has been relieved on the crank after it encounters the stop. When the pressure is relieved, the stop moves automatically to a position clearing the handle.

The subject matter of this application has been divided from application Serial No. 211,203, filed June 1, 1938, entitled "Autographic register," which matured into Patent No. 2,211,304, August 13, 1940. The claims in the original application are directed to other features of the autographic register shown herein.

Other objects and certain advantages will be more fully apparent from a description of the drawing in which:

Figure 1 is a perspective view of an autographic register showing the improved crank mechanism incorporated therein.

Figure 2 is a sectional view taken on line 2—2, Figure 1.

Figure 3 is a sectional view taken on line 3—3, Figure 2, showing the crank mechanism encountering the stop.

Figure 4 is a sectional view, similar to Figure 3, wherein the crank has been stopped positively.

Figure 5 is a view, similar to Figures 3 and 4, showing the stop in crank release position.

As stated, the crank mechanism of this invention is shown applied to an autographic register, generally indicated at 10. It is effective for operating the shaft 11 of the register which is fixed to one of the feed rolls (not shown) for feeding the paper forms 12. The feeding mechanism of the register constitutes a pair of rotatable annuli or discs fixed to the shaft 11 and having their peripheries frictionally cooperating with the periphery of an upper spring actuated roller. The web passing between the disc and the roller is advanced with the rotation of the crank. The discs are spaced laterally to correspond with the spacing of apertures located in the webs. The peripheries of the discs are interrupted so that the advance of the webs is discontinued or suspended at regular intervals. Aligning pins are associated with the feeding discs for taking up the feed in the last phase of each form advance and therefore aligning the forms 12. It is not believed necessary to illustrate this mechanism since it is conventional.

In operating the machine, the forms are fed longitudinally by rotation of crank 14 which is mounted on the outer end of the shaft 11. This rotates the feed discs in the manner previously described. The interrupting device which stops rotation of the crank after a full revolution and advance of set of forms, is generally indicated at 15.

Generally described, the device operates in the following manner: At the beginning of each cycle, the crank is in position as illustrated in Figure 5 of the drawing. The operator grasps the crank and turns it one complete revolution. Upon reaching the end of the revolution, the crank is engaged by a stop lug as shown in Figure 4 which positively halts further rotation of the crank. After the handle is released, however, the stop lug automatically retracts to permit the crank to be rotated again. The retraction of the stop occurs automatically upon release of the crank.

The crank indicated at 14 is fixed on the outer end of the shaft 11 and includes a handle 16. The shaft 11 is extended through the side wall 17 of the register casing which includes bearing bushings 18. The upper end of the crank includes a hub 19 for attachment to the shaft. The face of the crank member adjacent to the side wall 17 incorporates a pair of lugs 20 and 21, adapted to cooperate with a spring-operated lug 22 which is projected outwardly toward the crank from the inside of the housing wall 17. The forward edge of the lug 20 of the crank presents an inclined or cam surface 23. The lug 21 functions as a positive stop against further rotation of the crank.

The spring-operated lug 22 is mounted on an arm 24 pivoted at 25 on the side wall 17 of the machine frame. A tension spring 26 has its upper end secured over a tang 27 and its lower end secured to the arm 24. This spring normally urges the lug to its upward position in an arcuate slot 28 of the housing as shown in Figures 3 and 5.

As the crank approaches the stopping position toward the end of a feed cycle, the cam surface 23 of the lug 20 comes into contact with the upwardly positioned lug 22 and moves the lug downwardly by virtue of the inclined cam surface of the lug 23 against the tension of the spring 26. When the slug 22 reaches its lower position, it is then disposed in the path of movement of the lug 21 and acts as a positive stop against further rotation of the crank. The lug 22 will be held in its downward position by the friction between the two parts as long as pressure on the handle is continued. However, upon releasing the handle, the lug 22 will be carried upwardly by the srping to its position in the upper end of the arcuate slot 28. When the lug is in this position, it is clear of the stop lug 21 of the crank and the crank is free to be rotated for feeding the next set of forms from the machine.

It will be evident from the foregoing that the operation of the crank is automatically halted after each feeding operation. However, the halting is only momentary and the crank is automatically freed upon release of the handle. In this manner the operation of the machine is greatly facilitated since the usual operation of manipulating an extra stopping mechanism at the end of the stroke is eliminated, it being necessary only that the operator pause momentarily before feeding the next successive set of forms.

Having described my invention I claim:

A crank mechanism for rotating a shaft, said mechanism comprising a crank arm fixed to the shaft, a stop lug formed on the outer swinging end of the crank arm, a cam member on the outer swinging end of the crank arm providing a cam surface, a yieldable lug mounted adjacent the swinging end of the crank arm, said lug normally disposed in the path of movement of the cam member mounted on the outer end of the crank arm, the cam surface of said cam member inclined for directing said yieldable lug into the path of movement of the stop lug, said stop lug and cam member spaced apart so as to permit the yieldable lug to move upward behind the cam member and out of the path of the stop lug after the crank arm has been stopped and released.

HARRY J. WAECHTER.